United States Patent [19]

Bender et al.

[11] Patent Number: 4,737,372

[45] Date of Patent: Apr. 12, 1988

[54] MILK-SHAKE PRODUCT

[75] Inventors: Laurence D. Bender, Bedford; Mervyn R. Goddard, Rushden, both of Great Britain

[73] Assignee: Thomas J. Lipton, Inc., Englewood Cliffs, N.J.

[21] Appl. No.: 860,068

[22] Filed: May 6, 1986

[30] Foreign Application Priority Data

May 10, 1985 [GB] United Kingdom ............... 8511859

[51] Int. Cl.$^4$ .............................................. A23G 9/04
[52] U.S. Cl. ...................................... 426/5; 426/590; 426/613; 426/569; 426/241; 426/234
[58] Field of Search ............... 426/565, 569, 241, 234, 426/613

[56] References Cited

U.S. PATENT DOCUMENTS

| | | |
|---|---|---|
| 2,941,885 | 6/1960 | Tomlinson .................... 426/569 |
| 3,291,076 | 12/1966 | Flanigan et al. ................... 426/565 |
| 3,360,384 | 12/1967 | Kurzinski et al. ................. 426/565 |
| 4,031,261 | 6/1977 | Durst .................... 426/569 |
| 4,031,262 | 6/1977 | Nakayama et al. ................. 426/565 |
| 4,039,693 | 8/1977 | Adams et al. ....................... 426/569 |

FOREIGN PATENT DOCUMENTS 1484167 1/1977 United Kingdom .

Primary Examiner—Jeanette Hunter
Attorney, Agent, or Firm—Brumbaugh, Graves, Donohue & Raymond

[57] ABSTRACT

A milk-shake is prepared by freezing at least two portions of its constituents under different conditions, such that clearly different ice crystal sizes are generated, and freezing the combined portions to a storing temperature below $-15°$ C.; this frozen product is prepared for consumption by partly thawing it, using a controlled amount of microwave energy.

9 Claims, No Drawings

MILK-SHAKE PRODUCT

A milk-shake is usually made by thoroughly mixing milk, ice-cream and a flavouring material, such as fruit-flavoured syrup or fruit, to provide a cold, creamy fluid product having some overrun. Milk-shakes have to be prepared right before their consumption.

In the food-serving businesses, such as restaurants, cafetarias and canteens, it is relatively time-consuming to prepare milk-shakes, and attempts have been made to prepare them in advance in anticipation of peak business. However, conventionally prepared milk-shakes are not suitable for freezing and subsequent thawing, and attempts with different formulations which were more suitable for frozen storage led to off-taste and different textures and did not provide products comparable with the usual milk-shakes.

According to the invention, there is provided a method for making a milk-shake product comprising the steps of preparing a frozen aerated mix containing water, fat, sugar, stabilizer, emulsifier and flavour, and cooling the mix to a temperature below $-15°$ C., wherein such conditions are used that clearly different ice crystal sizes are generated in the mix in such relative amounts that, on thawing this frozen aerated mix using a controlled amount of microwave energy, such amount of ice crystals can be molten that the mix becomes generally fluid and the remainder of the crystals remain in a non-agglomerated condition dispersed in the fluid and that this amount of microwave energy is applied to the frozen mix for partly thawing it.

The particle size distribution of the ice crystals in the frozen mix can be very broad, i.e. considerably broader than in conventional aerated ice-cream products, but can also be such that at least two clearly discernible ranges of particle sizes are present.

A preferred and practical way of obtaining different ice crystal sizes is freezing at least two separate portions of an unfrozen mix under different conditions, such that different ice crystal sizes are generated, and thereafter combining these portions. The conditions used for controlling the ice crystal sizes are preferably the mixing conditions, because of the ease of controlling them. However, different ice crystal sizes may be obtained by first preparing two different emulsions, at least one of which being aerated, or by freezing the portions using different freezing rates.

In a preferred embodiment, a portion of the mix containing a relatively large amount of water and a relatively small amount of freezing point depressants is frozen hard, broken into relatively coarse particles and mixed with the remainder of the mix containing a correspondingly small amount of water and a correspondingly large amount of freezing point depressants and which is frozen under mixing conditions such that relatively fine ice crystals are formed.

Very suitably, a portion of the mix is frozen in a scraped-wall heat exchanger, another portion of the mix is frozen in another scraped-wall heat exchanger running at a different speed and the two portions are combined and mixed. In this embodiment standard ice-cream equipment can be used.

Another suitable way of obtaining the crystal size distribution aimed at is freezing a portion of the liquid mix under mixing conditions, adding another portion of the liquid mix and continuing freezing the combined portions under mixing conditions.

In a practical embodiment thereof, a portion of the liquid mix is frozen in a scraped-wall heat exchanger, another portion of the liquid mix is added thereto and the combined mix is frozen in a second scraped-wall heat exchanger. This method again is advantageous in that standard ice-cream equipment can be used.

In this specification and claims the expression "portion of the mix" comprises both portions of the same and of different composition.

The invention will be illustrated in the following non-limiting Examples, in which all percentages are by weight except for the overrun being by volume.

EXAMPLE I

A liquid base mixture consisting of

| | |
|---|---|
| milk solids non fat | 10% |
| sugars | 31% |
| butterfat | 5% |
| stabilizer and emulsifier | 0.6% |
| flavours and acidulant | 0.5% |
| water | to 100% | is frozen and aerated to 50% overrun in a usual ice-cream votator.

Fresh whole milk (8.7% milk solids non fat, 3.6% fat) is frozen and milled to particle sizes ranging from about 100 microns to about 1000 microns, which are relatively coarse as compared with the ice crystal sizes in the frozen base mix.

57% frozen base mix is mixed with 43% milled frozen milk and the combined mix is frozen to usual temperatures for storing and distributing ice-cream.

300 ml of the hard-frozen product is put in a 1000 W microwave oven and heated for about 50 seconds, such that the fine ice crystals are melted but the coarse crystals are still present in the final product. The actual heating time is dependent on the oven design and can be easily determined.

EXAMPLE II

A liquid mixture, consisting of

| | |
|---|---|
| milk solids non fat | 9% |
| sugars | 18% |
| butterfat | 4% |
| stabilizer and emulsifier | 0.3% |
| flavours and acidulant | 0.4% | is fed in equal streams to two identical scraped-wall heat exchangers, one operating under normal conditions for making ice-cream having 100% overrun, the other rotating at one fifth of the speed of the first one, giving rise to larger ice crystals and no overrun.

These streams are combined, mixed and frozen to usual temperatures for storing and distributing ice-cream.

This hard-frozen product can be prepared for consumption as described in Example I.

EXAMPLE III

A liquid base mixture as defined in Example I is frozen in a usual manner in an ice-cream votator.

Thereafter, milk is added in a ratio of 60% base mixture to 40% milk and the combined mixture is further frozen in a second votator and finally cooled to usual storage temperatures for ice confection products.

This hard-frozen product can be prepared for consumption as described in Example I.

We claim:

1. A method for making a milk-shake product comprising the steps of
   (a) preparing a mix containing water effective amounts of, fat, sugar, stabilizer, emulsifier and flavorant;
   (b) separating the mix into at least two portions
   (c) freezing a first portion of the mix while aerating to a temperature of less than $-15°$ C. thereby forming ice crystals of a larger size
   (d) freezing a second portion of the mix so as to form ice crystals of a smaller size; and
   (e) combining said portions to form a milk shake product containing the two sizes of ice crystals, wherein said crystals are sufficiently different in size so that upon exposure to an amount of microwave energy the smaller size ice crystals are melted while the larger size ice crystals remain, and said smaller and larger crystals being present in amounts such that when the smaller crystals but not the larger crystals are melted the product is a fluid.

2. A method according to claim 1, wherein the different size ice crystals in said first and second portions result from freezing said first and second portions under different mixing conditions.

3. A method according to claim 1, wherein the different size ice crystals in said first and second portions result from freezing said first and second portions at different rates.

4. A method according to claim 1, wherein the portions of the mix have different compositions, said first portion having a relatively greater amount of water than said second portion, and wherein said first portion is frozen hard and broken into coarse ice particles before being combined with said frozen second portion.

5. A method according to claim 1, further comprising the step of exposing the milk-shake product to the amount of microwave energy such that a fluid ready-for-consumption milk shake is formed.

6. A method according to claim 2, wherein said first portion of the mix is frozen in a scraped-wall heat exchanger, said second portion of the mix is frozen in another scraped-wall heat exchanger running at a different speed and the two portions are combined and mixed.

7. A method according to claim 2, wherein separately frozen portion of the mix is frozen in a scraped-wall heat exchanger, a second portion of the liquid mix is added and the combined portions are frozen in a second scraped-wall heat exchanger.

8. A method for making a milk-shake product comprising the steps of
   (a) preparing a mix containing effective amounts of water, fat, sugar, stabilizer, emulsifier and flavorant;
   (b) separating the mix into at least two portions;
   (c) freezing a first portion of the mix while aerating
   (d) combining said frozen first portion of the mix with the remaining portions of the mix; and
   (e) freezing the combined mix to a temperature of less than $-15°$ C. thereby forming a milk-shake product containing smaller and larger ice crystals, said crystals being sufficiently different in size that upon exposure to an amount of microwave energy the smaller ice crystals are melted while the larger ice crystals remain, and said smaller and larger crystals being present in amounts such than when the smaller ice crystals but not the larger crystals are melted the product is a fluid.

9. A method according to claim 1, further comprising the step of exposing the milk-shake product to an amount of microwave energy such that a fluid ready-for-consumption milk-shake is formed.

* * * * *

UNITED STATES PATENT AND TRADEMARK OFFICE
CERTIFICATE OF CORRECTION

PATENT NO. : 4,737,372

DATED : April 12, 1988

INVENTOR(S) : Bender et al.

It is certified that error appears in the above-identified patent and that said Letters Patent is hereby corrected as shown below:

Col. 3, line 6, after "water", insert --,--;

Col. 3, line 7, after "of", delete --,--;

Col. 4, lines 10 and 11, "claim 2, wherein separately frozen" should read --claim 8, wherein the first--; and Col. 4, line 34, "claim 1," should read --claim 8,--.

Signed and Sealed this

Twentieth Day of September, 1988

Attest:

DONALD J. QUIGG

*Attesting Officer*  *Commissioner of Patents and Trademarks*